3,256,148
SULFONAMIDE FUNGICIDES

Angelo John Speziale, Creve Coeur, and Gino J. Marco, Webster Groves, Mo., assignors to Monsanto Company, St. Louis, Mo., a corporation of Delaware
No Drawing. Original application Oct. 12, 1961, Ser. No. 144,561. Divided and this application July 2, 1964, Ser. No. 380,070
4 Claims. (Cl. 167—33)

This application is a division of copending application Serial No. 144,561, filed October 12, 1961.

This invention relates to new and useful sulfonamides and to methods of making same.

In accordance with this invention there is provided a new and useful class of compounds, namely N-(2-tetrahydropyranyl) sulfonamides of the formula

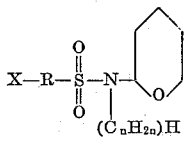

wherein $n$ is an integer of from 0 to 5; R is an aromatic hydrocarbon containing up to and including 12 carbon atoms and free of aliphatic unsaturation, and X is a member of the group consisting of hydrogen, chloro, bromo, nitro, amino and lower alkoxy.

These sulfonamides can be prepared in a facile manner by reacting 2,3-dihydropyran with a sulfonamide of the formula

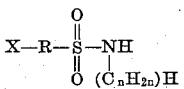

wherein R, X and $n$ have the above described significance in the presence of an acid catalyst. While a wide range of reaction temperatures can be employed provided the reaction system is fluid (i.e. above the freezing point of the system up to and including the boiling point of the system) it is preferable to employ a reaction temperature in the range of from about 50° C. to about 125° C. Where and when desired an inert organic solvent can be used, as for example benzene, toluene, xylene, acetone, butanone, dioxane, dimethyl sulfoxide, and the like.

As aforementioned the sulfonamide reactants are of the formula

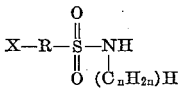

and as illustrative of the substituent R are phenyl, tolyl, xylyl, ethylphenyl, propylphenyl, butylphenyl, hexylphenyl, biphenylyl, naphthyl, indenyl, and the various isomeric forms thereof containing up to and including 12 carbon atoms. As specifically illustrative of the sulfonamide reactants are benzene sulfonamide, N-methyl benzenesulfonamide, N-ethyl benzenesulfonamide, N-isoamyl benzenesulfonamide, p-toluenesulfonamide, o-toluenesulfonamide, N-methyl p-toluenesulfonamide, N-ethyl p-toluenesulfonamide, N-isopropyl o-toluenesulfonamide, p-tert.-butylbenzenesulfonamide, p-biphenylylsulfonamide, 2-naphthylsulfonamide, 4-chlorobenzenesulfonamide, 3,4-dichlorobenzenesulfonamide, 4-nitrobenzenesulfonamide, 3-bromobenzenesulfonamide, 4-aminobenzenesulfonamide, 4-methoxybenzenesulfonamide, 4-ethoxybenzenesulfonamide, 3-n-amyloxybenzenesulfonamide, 4-fluorobenzenesulfonamide, etc. The preferred sulfonamide reactants are those of the formula

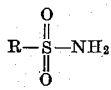

wherein R is an aromatic hydrocarbon radical containing up to and including 12 carbon atoms.

As illustrative of the preparation of the sulfonamides of this invention is the following:

Example I

To a suitable reaction vessel equipped with a thermometer, agitator and reflux condenser is charged 17.1 parts by weight (substantially 0.1 mol) of p-toluenesulfonamide, 8.4 parts by weight (substantially 0.1 mol) of 2,3-dihydropyran, and approximately 45 parts by weight of benzene. While agitating and at room temperature there is added approximately 0.08 part by weight of hydrogen chloride in approximately 0.5 part by weight of diethyl ether. The mixture is then refluxed for 2 hours. Thereafter the reaction mass is cooled to room temperature and subjected to vacuum distillation at 40–45° C. to remove the volatiles. The residue, a solid, is N-(2-tetrahydropyranyl) p-toluenesulfonamide. Upon recrystallizing this solid from diethylether the melting point is found to be 106–107.5° C.

Example II

Employing the procedure of Example I but replacing p-toluenesulfonamide with a substantially equimolecular amount of benzenesulfonamide there is obtained N-(2-tetrahydropyranyl) benzenesulfonamide.

Example III

Employing the procedure of Example I but replacing p-toluenesulfonamide with a substantially equimolecular amount of 4-chlorobenzenesulfonamide there is obtained N-(2-tetrahydropyranyl) 4-chlorobenzenesulfonamide.

Example IV

To a suitable reaction vessel equipped with a thermometer, agitator and reflux condenser is charged 21.3 parts by weight (substantially 0.1 mol) of N-n-butylbenzenesulfonamide, 9 parts by weight (substantially 0.11 mol) of 2,3-dihydropyran, and approximately 60 parts by weight of benzene. While agitating and at room temperature there is added approximately 0.08 part by weight of hydrogen chloride in approximately 0.5 part by weight of diethyl ether. The mixture is then refluxed for 16 hours. Thereafter the reaction mass is cooled to room temperature and subjected to vacuum distillation to remove the volatiles. The residue, a liquid, is N-(2-tetrahydropyranyl) N-n-butylbenzenesulfonamide.

Example V

Employing the procedure of Example I but replacing p-toluenesulfonamide with a substantially equimolecular amount of p-aminobenzenesulfonamide there is obtained N-(2-tetrahydropyranyl) p-aminobenzenesulfonamide.

Example VI

Employing the procedure of Example I but replacing p-toluenesulfonamide with a substantially equimolecular amount of 4-nitrobenzenesulfonamide there is obtained N-(2-tetrahydropyranyl) 4-nitrobenzenesulfonamide.

Other acid catalysts than hydrogen chloride which are operable include the strong mineral acids such as hydrogen bromide, sulfuric acid, and the like, and the aromatic sulfonic acids such as benzene sulfonic acid, p-toluene sulfonic acid, and the like. Any catalytic amount of the acid catalyst can be used but in general from 0.01 to 2 percent by weight based on the 2,3-dihydropyran will be employed in preparing the sulfonamides of this invention.

Other sulfonamides of this invention prepared in accordance with the aforedescribed process employing the appropriate sulfonamide reactant include:

N-(2-tetrahydropyranyl) N-methylbenzenesulfonamide
N-(2-tetrahydropyranyl) N-ethylbenzenesulfonamide
N-(2-tetrahydropyranyl) 3,4-dichlorobenzenesulfonamide
N-(2-tetrahydropyranyl) 2,4-dinitrobenzenesulfonamide
N-(2-tetrahydropyranyl) p-tert.-butylbenzenesulfonamide
N-(2-tetrahydropyranyl) p-biphenylylsulfonamide
N-(2-tetrahydropyranyl) 2-naphthylsulfonamide
N-(2-tetrahydropyranyl) p-isohexylbenzenesulfonamide
N-(2-tetrahydropyranyl) N-isoamylbenzenesulfonamide
N-(2-tetrahydropyranyl) 4-methoxybenzenesulfonamide
N-(2-tetrahydropyranyl) 4-ethoxybenzenesulfonamide.

The sulfonamides of this invention are useful as fungicides, particularly as foliage fungicides, and as illustrative of their activity is the following:

Quadruplet cucumber plants (14 to 21 days old) having the first leaf the size of a half-dollar are sprayed to "run-off" with an aqueous emulsion containing 1250 p.p.m. of N-(2-tetrahydropyranyl) p-toluenesulfonamide at a rate of 10 ml. per 45 seconds using 10 pounds air pressure while rotating the plants on a turntable in a spray chamber. For control purposes one leaf of each plant is covered with a plastic shield prior to spraying. After spraying to "run-off" the spray deposit is permitted to dry and the treated and the untreated leaves of the plants are sprayed with a spore suspension containing 30,000 to 40,000 conical spores of *Collectotrichum lagenarium* per ml. The so-inoculated plants are immediately placed in a 100% humid atmosphere at 70° F. After 36 hours the plants are removed to the greenhouse. After 3 to 5 days lesion counts are made on the first leaf of each of the four cucumber plants. There were no lesions on the first leaf of each plant treated with N-(2-tetrahydropyranyl) p-toluenesulfonamide however the respective control or untreated leaves displayed more than 50 lesions per leaf.

While this invention has been described with respect to certain embodiments, it is to be understood that it is not so limited and that variations and modifications thereof obvious to those skilled in the art can be made without departing from the spirit and scope thereof.

What is claimed is:

1. The method of controlling fungal growth which comprises contacting said fungus with a fungicidal amount of a N-(2-tetrahydropyranyl) sulfonamide of the formula

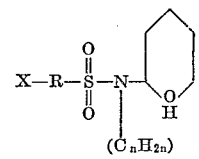

wherein $n$ is an integer of from 0 to 5; R is an aromatic hydrocarbon containing up to and including 12 carbon atoms and free of aliphatic unsaturation, and X is a member of the group consisting of hydrogen, chloro, bromo, nitro, amino and lower alkoxy.

2. The method of controlling fungal growth upon foliage which comprises contacting said foliage with a fungicidal amount of a N-(2-tetrahydropyranyl) sulfonamide of the formula

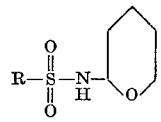

wherein R is an aromatic hydrocarbon radical containing up to and including 12 carbon atoms and is composed solely of carbon and hydrogen atoms and is free of any aliphatic unsaturation.

3. The method of controlling fungal growth which comprises contacting said fungus with a fungicidal amount of N-(2-tetrahydropyranyl) p-toluenesulfonamide.

4. The method of controlling fungal growth upon foliage which comprises contacting said foliage with a fungicidal amount of N-(2-tetrahydropyranyl) benzenesulfonamide.

References Cited by the Examiner

UNITED STATES PATENTS

| | | | |
|---|---|---|---|
| 2,562,042 | 7/1951 | Kipnis | 260—345.1 |
| 3,072,672 | 1/1963 | Hickner | 260—307 |

OTHER REFERENCES

Cerkovnikov et al.: Chemische Berichte, vol. 74, pp. 1648–1657 (1941).

Glacet: Soc. Chim. de France, vol. 21, pp. 575–586 (1954).

JULIAN S. LEVITT, *Primary Examiner*.